US008190811B2

(12) United States Patent
Moon et al.

(10) Patent No.: US 8,190,811 B2
(45) Date of Patent: May 29, 2012

(54) DEFRAGMENTATION OF SOLID STATE MEMORY

(75) Inventors: John Edward Moon, Superior, CO (US); Todd Ray Strope, Longmont, CO (US)

(73) Assignee: Seagate Technology, LLC, Cupertino, CA (US)

( * ) Notice: Subject to any disclaimer, the term of this patent is extended or adjusted under 35 U.S.C. 154(b) by 274 days.

(21) Appl. No.: 12/480,935

(22) Filed: Jun. 9, 2009

(65) Prior Publication Data
US 2010/0312983 A1 Dec. 9, 2010

(51) Int. Cl.
G06F 13/00 (2006.01)
(52) U.S. Cl. ............ 711/103; 711/165; 711/E12.009
(58) Field of Classification Search .................. None
See application file for complete search history.

(56) References Cited

U.S. PATENT DOCUMENTS

| | | | |
|---|---|---|---|
| 5,860,082 A | 1/1999 | Smith et al. | 711/103 |
| 6,038,636 A | 3/2000 | Brown, III et al. | 711/103 |
| 6,834,281 B1* | 12/2004 | Borthakur | 1/1 |
| 7,051,055 B1 | 5/2006 | Schneider | 707/206 |
| 7,401,174 B2* | 7/2008 | So et al. | 711/4 |
| 7,409,522 B1 | 8/2008 | Fair et al. | 711/170 |
| 7,506,013 B2 | 3/2009 | Schneider | 707/206 |
| 7,725,506 B1* | 5/2010 | Stringham | 707/822 |
| 2003/0065899 A1 | 4/2003 | Gorobets | 711/165 |
| 2003/0133348 A1 | 7/2003 | Wong | 365/222 |
| 2006/0107017 A1* | 5/2006 | Serizawa et al. | 711/170 |
| 2009/0002863 A1 | 1/2009 | Feldman et al. | 360/48 |
| 2009/0048976 A1 | 2/2009 | Hars | 705/50 |
| 2009/0055620 A1 | 2/2009 | Feldman et al. | 711/202 |
| 2009/0094389 A1 | 4/2009 | Keeler et al. | 710/33 |
| 2009/0300318 A1* | 12/2009 | Allen et al. | 711/206 |
| 2009/0327582 A1* | 12/2009 | Chartrand | 711/103 |
| 2010/0057818 A1* | 3/2010 | Gao et al. | 707/813 |

* cited by examiner

Primary Examiner — Edward Dudek, Jr.
Assistant Examiner — Sean D Rossiter
(74) Attorney, Agent, or Firm — Cesari & Reed, LLP; Kirk A. Cesari

(57) ABSTRACT

A data storage device includes a solid state data storage medium, a set of related data blocks and a controller. The set of related data blocks are non-contiguously stored on the data storage medium and have an original write sequence. The controller, responsive to a defragmentation request, maps the physical block addresses of the set of related data blocks to contiguous logical block addresses in the original write sequence while maintaining the non-contiguous physical block addresses of the set of related data blocks on the data storage medium.

17 Claims, 4 Drawing Sheets

112

| Physical Block Address | ... | P | P+1 | P+2 | P+3 | P+4 | P+5 | P+6 | ... |
|---|---|---|---|---|---|---|---|---|---|
| Data Storage Medium | ... | data 0 | data 1 | data 2 | data 3 | data 4 | data 5 | | ... |

| LBA | PBA |
|---|---|
| ⋮ | ⋮ |
| L | P |
| L+1 | P+1 |
| L+2 | P+2 |
| L+3 | P+3 |
| L+4 | P+4 |
| L+5 | P+5 |
| L+6 | |
| ⋮ | ⋮ |

| Physical Block Address | ... | P | P+1 | P+2 | P+3 | P+4 | P+5 | P+6 | ... |
|---|---|---|---|---|---|---|---|---|---|
| Data Storage Medium | ... | data 0 | data 1 | | data 3 | data 4 | data 5 | data 2 | ... |

| LBA | PBA |
|---|---|
| ⋮ | ⋮ |
| L | P |
| L+1 | P+1 |
| L+2 | |
| L+3 | P+3 |
| L+4 | P+4 |
| L+5 | P+5 |
| L+6 | P+6 |
| ⋮ | ⋮ |

| LBA | PBA |
|---|---|
| ⋮ | ⋮ |
| L | P |
| L+1 | P+1 |
| L+2 | P+6 |
| L+3 | P+3 |
| L+4 | P+4 |
| L+5 | P+5 |
| L+6 | |
| ⋮ | ⋮ |

DEFRAGMENTATION OF SOLID STATE MEMORY

FIELD OF THE DISCLOSURE

This disclosure generally relates to defragmentation operations on data storage devices, and more particularly, but not by limitation, to defragmentation operations performed on solid state storage devices.

BACKGROUND OF THE DISCLOSURE

Computer and other electronic devices generally require a medium in which digital data can be stored and retrieved. Data storage devices come in a variety of forms and serve a variety of purposes. These devices can be broken down into two general categories: solid state and non-solid state storage devices.

Non-solid state storage devices include devices that contain moving parts. Some typical non-solid state storage devices are hard disc drives, CD/RW drives and discs, DVD/R/RW drives and discs, floppy discs tape drives and probe memory devices. These data storage devices move one or more media surfaces and/or the associated data head relative to one another to position the data head relative to a desired location for writing and/or reading data on the media. In disc drives for example, data is stored on a disc that rotates at an essentially constant velocity. By moving the head over the rotating disc, all memory locations or sectors of the disc can be accessed.

Solid state memory devices differ from non-solid state data storage devices in that they typically have no moving parts. One example of solid state memory is the flash type of EEPROM (Electrically Erasable Programmable Read-Only Memory), which is used primarily for easy and fast information storage in such devices as digital cameras, home video game counsels and personal digital assistance.

Due to frequent loading and unloading of data, computer operating systems that store information on a hard drive end up having the different segments or blocks of data associated with the same file dispersed non-contiguously located on the drive media. This leads to inefficient and slow reads of the associated file, for example due to mechanical movement required to access the multiple file segments, and the need for the operating system to send requests to read the data in small segments. To address such inefficiencies, the operating system will occasionally implement a defragmentation operation designed to relocate these related non-contiguous data segments such that they are contiguous.

Embodiments described herein provide solutions to these and other problems, and offer other advantages over the prior art.

SUMMARY

Embodiments of the invention relate to the defragmentation of a solid state data storage medium. Embodiments are directed to a data storage device that includes a solid state data storage medium, a set of related data blocks and a controller. The set of related data blocks are non-contiguously stored on the data storage medium and have an original write sequence. The controller, responsive to a defragmentation request, maps the physical block addresses of the set of related data blocks to contiguous logical block addresses in the original write sequence while maintaining the non-contiguous physical block addresses of the set of related data blocks on the data storage medium.

Other embodiments are directed to a system comprising a data storage device, a processor and a modified defragmentation program. The data storage device comprises a controller, a solid state data storage medium, a set of related data blocks non-contiguously stored on the data storage medium having an original write sequence. The processor is configured to execute a defragmentation operation on the data storage device. The defragmentation operation includes requests to locate the set of related data blocks contiguously on the data storage medium in the original write sequence. The modified defragmentation program comprises instructions, which are executable by the controller to perform a modified defragmentation method, responsive to the defragmentation requests. In the method, the non-contiguous physical block addresses of the set of related data blocks are mapped to contiguous logical block addresses in the original write sequence using the controller, and the non-contiguous physical block addresses of the set of related data blocks are maintained on the data storage medium.

Another embodiment is directed to a method. In the method, a data storage device is provided. The data storage device comprises a controller, a solid state data storage medium, a set of related data blocks non-contiguously stored on the data storage medium that have an original write sequence. A defragmentation operation on the data storage device is detected using the controller. The defragmentation operation includes requests to locate the set of related data blocks contiguously on the data storage medium in the original write sequence. A modified defragmentation operation is performed on the data storage device responsive to detecting the defragmentation operation. In the modified defragmentation method, the physical block addresses of the set of related data blocks are mapped to contiguous logical block addresses using the controller, and the non-contiguous physical block addresses of the set of related data blocks are maintained on the data storage medium.

Other features and benefits that characterize embodiments of the present disclosure will be apparent upon reading the following detailed description and review of the associated drawings.

BRIEF DESCRIPTION OF THE DRAWINGS

FIG. 3 is a simplified diagram of a portion of an exemplary solid state data storage medium illustrating a contiguous set of related data blocks and their physical block addresses.

FIG. 4 is a mapping of the physical block addresses of the solid state data storage medium of FIG. 3 to contiguous logical block addresses.

FIG. 5 is a simplified diagram of a portion of an exemplary solid state data storage medium illustrating a non-contiguous set of related data blocks and their physical block addresses.

FIG. 6 is a mapping of the physical block addresses of the solid state data storage medium of FIG. 5 to non-contiguous logical block addresses.

FIG. 7 is a modified mapping of the physical block addresses of the solid state data storage medium of FIG. 5 to contiguous logical block addresses.

DETAILED DESCRIPTION OF ILLUSTRATIVE EMBODIMENTS

While defragmentation has worked well for non-solid state data storage devices, such as disc drives, the present inventors have recognized that the same benefits would not be expected when solid state memory is used as the data storage device. For instance, since solid state data storage devices do not require mechanical movement to access physically dispersed segments of data, the defragmentation operation does not improve the speed of data accesses. Moreover, the relocation of data within certain solid state data storage devices, such as flash memory, can create significant wear to the memory cells and reduce the useful lifespan of the solid state data storage device.

In accordance with certain embodiments, the present invention is directed to mapping of non-contiguous physical block addresses of a set of related data blocks to logical block addresses that preserve the original write sequence of the related data blocks. In this way, defragmentation requests may be handled by the storage device controller without data read, erase, and write operations that may otherwise reduce device performance or cause lifetime-reducing wear.

Embodiments are generally directed to data storage devices that include a solid state data storage medium, systems including such the data storage devices, and methods utilizing such data storage devices.

Figure 1:
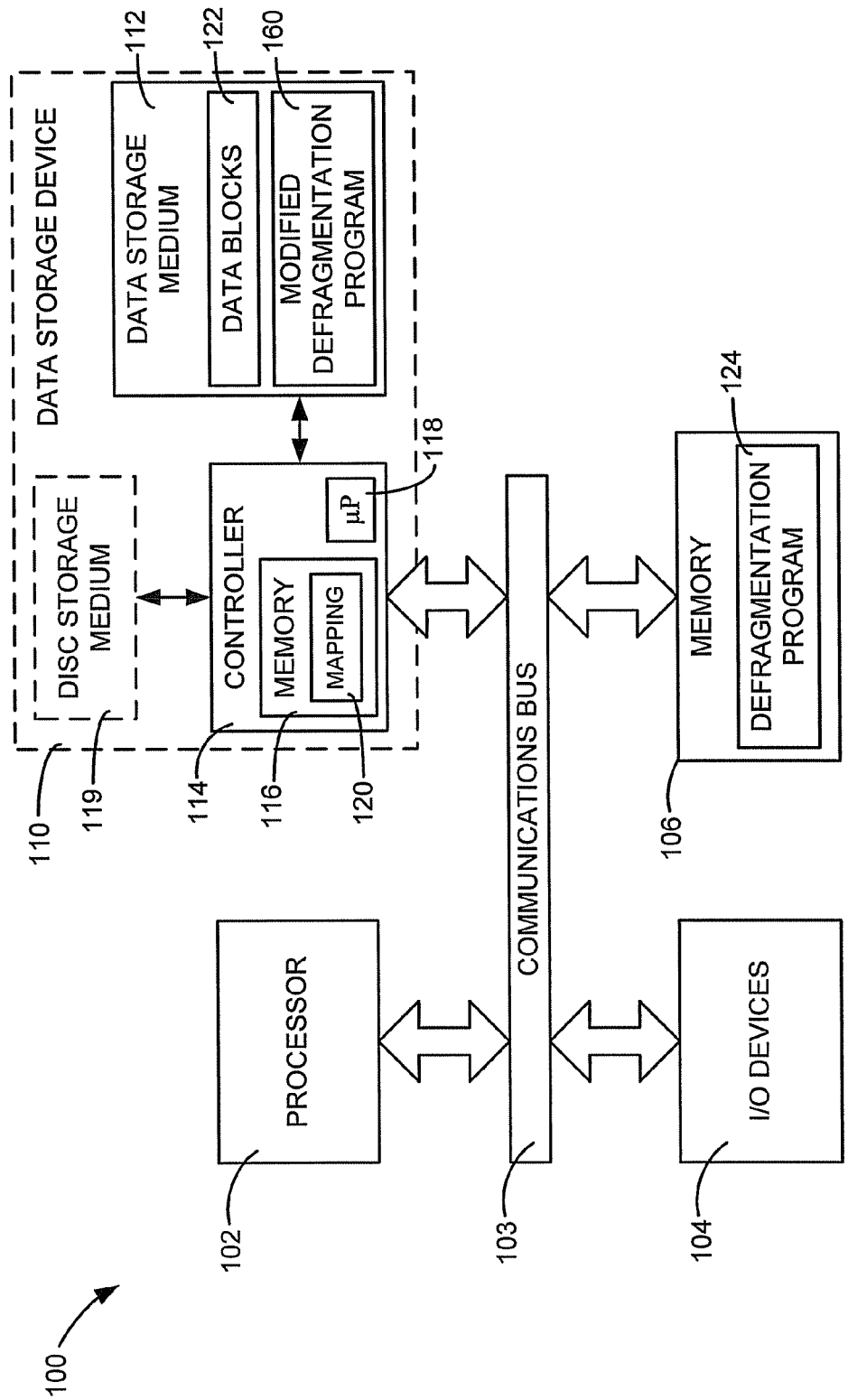
FIG. 1 is a block diagram of a system in accordance with embodiments of the invention.

FIG. 1 is a block diagram of a system 100 in accordance with embodiments of the invention. The system 100 may represent a computer, a personal digital assistant, a mobile phone, or other electronic device. Embodiments of the system may include a processor 102 connected to a communications bus 103, over which data communications are delivered. The communications bus 103 can also be connected to input/output (I/O) devices 104, such as, for example, a keyboard, monitor, data storage device, pointing device, or other device. The communications bus 103 may also be coupled to a memory 106, which may be a random access volatile memory, such as dynamic random access memory (DRAM).

In certain embodiments, the system 100 includes a data storage device 110 comprising a solid state data storage medium 112. In one embodiment, the data storage device 110 is coupled to the communications bus 103, through which data communications with the processor 102 and other components of the system 100 can be made. In one embodiment, the data storage device 110 comprises a controller 114. In one embodiment, the controller 114 includes a memory 116 and/or a microprocessor 118.

In one embodiment, the solid state data storage medium 112 comprises non-volatile flash memory, such as NAND or NOR flash memory, for example. The data storage medium 112 may comprise an array of flash memory cells, which are formed by one or more integrated circuit memory chips. Flash memory may require a whole block of old data to be erased prior to writing new data to the block. When a block of data is erased in a flash memory, all of the bits of data end up in a single state. Typically, this state is set to a logical "1". Subsequent writes can change bits of this block of data to the other state, typically logical "0". The number of successful erases that can be performed on flash memory is limited and, therefore, partially controls the useful lifespan of the flash memory.

One embodiment of the data storage device 110 comprises a disc storage medium 119. The disc storage medium 119 supplements the data storage capacity of the solid state data storage medium 112. In one embodiment, the disc storage medium 119 comprises a magnetic disc storage medium, such as one or more magnetic recording discs found in hard disc drives. In accordance with another embodiment, the disc storage medium 119 comprises an optical disc storage medium, such as a recordable compact disc (CD) or a recordable digital video disc (DVD).

In one embodiment, the controller 114 is responsible for processing requests communicated from the processor 102 to perform read and write operations on the solid state data storage medium 112 and, if present, the disc storage medium 119. The requests generally include an identification of a range of logical block addresses that correspond to physical block addresses (e.g., physical locations) of the data storage medium 112 or disc storage medium 119, on which a read or write operation is to occur. In one embodiment, the data storage device 110 comprises a mapping 120, which can be stored in the memory 116 of the controller, the data storage medium 112, or other data store that is accessible by the controller 114. The mapping 120 may be in the form of a look-up table, in which logical block addresses (LBA's) are associated with physical block addresses (PBA's) of the data storage medium 112. In one embodiment, the mapping 120 is used by the controller 114 to match the logical block addresses identified in the requests to the corresponding physical block addresses, and perform the read or write operation on the matched physical block addresses in accordance with conventional methods.

When data is originally written to a data storage medium, such as data storage medium 112, blocks of related data (e.g., data relating to the same file) are typically written to the data storage medium contiguously (i.e., adjoining) and in an original sequence. Over time, the data blocks are physically relocated on the data storage medium such that they are no longer contiguously stored in the original sequence due to frequent loading and unloading of the data. Defragmentation operations are often performed to relocate the data blocks such that they are contiguously stored in the original sequence on the data storage medium through a series read and write operations.

Embodiments of the present invention are concerned with the read and write operations that are to be performed on the solid state data storage medium 112 by the controller 114 responsive to the defragmentation operation executed by the processor 102. In particular, the solid state data storage medium 112 may not share all of the benefits of the defragmentation operation experienced by hard disc drives, such as improved data reading efficiency from reduced mechanical movements. Additionally, when the data storage medium 112 comprises flash memory, the execution of defragmentation operations on the medium 112 may reduce the effective lifespan of the flash memory due to the erasures and writes required to complete the operations.

Figure 2:
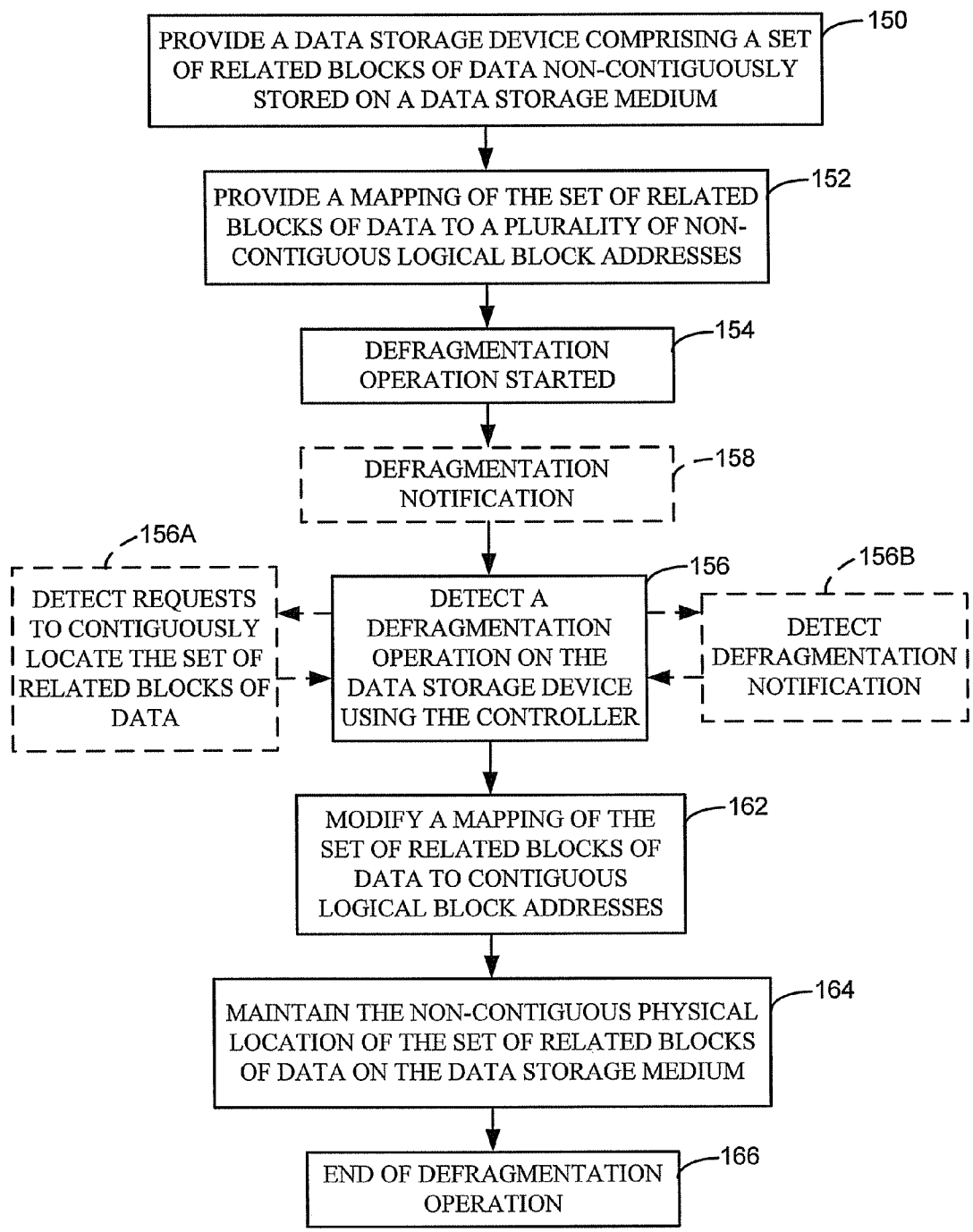
FIG. 2 is a flowchart illustrating a method in accordance with embodiments of the invention.

FIG. 2 is a flowchart illustrating a method in accordance with embodiments of the invention. In one embodiment, a set of related data blocks 0-5, generally referenced as related data blocks 122, relate to the same file and are originally contiguously written to the data storage medium 112 in an original sequence. FIG. 3 is a simplified diagram of a portion of the data storage medium 112 that illustrates the contiguous location of the related data 0-5 and their corresponding physical block addresses. For instance, data 0 has a physical block address P, data 1 has a physical block address P+1, etc. The corresponding mapping 120 of the related data blocks 132 of FIG. 3 is illustrated in FIG. 4. When the related data blocks 122 are originally written to the data storage medium 112, the corresponding logical block addresses may also be contiguous and in the original sequence, as shown in FIG. 4. Thus, physical block address P corresponds to the logical block address L, the physical block address P+1 corresponds to the logical block address L+1, etc.

At 150 of the method, the data storage device 112 is provided in a state where the set of related data blocks 122 are non-contiguously stored on the data storage medium 112. The change to this non-contiguously written data state from the contiguously written data state of FIG. 3 generally occurs over time as a result of read and write operations performed on the data storage medium 112. For example, data 2 may be relocated to physical block address P+6, as illustrated in FIG. 5, resulting in the non-contiguously written data state of the set of related data blocks 122. The related data 0-5 is also no longer in the original sequence (FIG. 2). As a result, the physical block addresses corresponding to the set of related data blocks 122 are no longer contiguous or in the original sequence, as shown in FIG. 5.

The mapping 120 of the data storage medium 112 illustrated in FIG. 5 is provided at 152. In one embodiment, the relocation of data 2 also modifies the logical block address corresponding to data 2. For example, the relocation of data 2 may cause the logical block address corresponding to data 2 to change from logical block address L+2 (FIG. 4) to logical block address L+6, as shown in FIG. 6. The logical block addresses corresponding to the non-contiguously written set of related data blocks 122 are also non-contiguous and are no longer in the original sequence.

At 154, a defragmentation operation is started on the data storage device 110 and, more specifically, the solid state data storage medium 112. In one embodiment, the system 100 includes a defragmentation program 124 stored in the memory 106, or other data store that is accessible by the processor 102. The defragmentation program 124 comprises instructions that, when executed by the processor 102, execute the defragmentation operation on the data storage device 110. In one embodiment, the defragmentation operation comprises one or more requests each comprising instructions (e.g., read and write instructions) to relocate one or more of the non-contiguous related blocks of data 122 (FIG. 5) on the data storage medium 112 such that they are located at contiguous physical block addresses. In one embodiment, the requests are intended to contiguously locate the set of related data blocks 122 on the data storage medium 112 in the original sequence.

At 156, the defragmentation operation on the data storage device 110 is detected using the controller 114. In one embodiment, the detection of the defragmentation operation on the data storage device 110 comprises examining the requests to detect whether the requests are intended to contiguously locate the set of related data blocks 122 (FIG. 5) on the data storage medium 112, as indicated at 156A. In one embodiment of 156A, the controller 114 detects the defragmentation operation when the requests include instructions to read a portion of the set of related data blocks 122 from a logical block address and write the data block to another logical block address.

In one embodiment, the defragmentation operation requests communicated to the controller 114 in response to the defragmentation operation 154 include a defragmentation notification, as indicated at 158. In one embodiment, the defragmentation notification is generated by the processor 102 in response to the execution of the defragmentation program 124 stored in the memory 106. One embodiment of the detection step 156 includes the detection of the defragmentation operation through the detection of the defragmentation notification, as indicated at 156B.

In one embodiment, responsive to the detection of the defragmentation operation (156) on the data storage device 110, a modified defragmentation operation is executed. In one embodiment, the system 100 comprises a modified defragmentation program 160, stored on the data storage medium 112 (FIG. 1), the memory 116, or other data store that is accessible by the controller 114. The modified defragmentation program 160 comprises instructions executable by the controller 114 to perform the modified defragmentation operation described herein.

In one embodiment, the modified defragmentation operation prevents the relocation or rewriting of the non-contiguous related data blocks 122 (FIG. 5) on the data storage medium 112 in a contiguous pattern, but modifies the mapping 120 such that the non-contiguous logical block addresses corresponding to the related data blocks 122 are in a contiguous pattern.

One embodiment of the modified defragmentation operation comprises modifying the mapping 120 of the set of related data blocks 122 to contiguous logical block addresses, as indicated at 162. This generally involves re-associating one or more of the physical block addresses of the related blocks of data 122 to contiguous logical block addresses. For example, the modified defragmentation operation may revise the mapping 120 of the non-contiguous set of related data blocks 122 on the medium 112 shown in FIG. 6 by moving the logical block address associated with the physical block address P+6 from L+6 to L+2, as illustrated in the modified mapping 120 shown in FIG. 7. As a result, the logical block addresses (L through L+5) corresponding to the set of related data blocks 122 are contiguous. Additionally, in accordance with another embodiment, the logical block addresses corresponding to the set of related data blocks 122 in the modified mapping 120 are in the original sequence. Accordingly, the modification of the mapping at 162 does not involve rewriting the related blocks of data 122 to another physical location on the solid state data storage medium 112.

The modified defragmentation operation also maintains the non-contiguous physical location of the set of related data blocks on the stat storage medium 112, as indicated at 164. This means that the set of related data blocks 122 are not re-written to another physical location as directed by the requests of the defragmentation operation. Thus, the modified defragmentation operation ignores the requests of the defragmentation operation to relocate any one of the set of related data blocks 122 (data 0-5) on the medium 112.

The re-mapping of the non-contiguous logical block addresses of the related data blocks 122 to contiguous logical block addresses improves data access performance of the system 100. For instance, accessing (i.e., reading) the non-contiguous related blocks of data 122 (FIG. 5) requires the processor 102 to provide multiple requests, each request identifying a non-contiguous logical block address corresponding to a portion of the related blocks of data 122. However, when the logical block addresses corresponding to the related blocks of data 122 are contiguously arranged in the modified mapping 120 (FIG. 7), the processor 102 can access the related blocks of data 122 using a single request, thereby improving the efficiency at which the data 122 on the data storage medium 112 is accessed.

Once the defragmentation operation ends, at 166, the set of related data blocks 122 may be erased and/or rewritten to another physical location on the medium 112, responsive to requests from the processor 102 that are unrelated to the defragmentation operation. Accordingly, the modified defragmentation operation would not be triggered by such requests and the set of related data blocks 122 are no longer maintained (164) in their physical location on the medium 112 by the controller 114. Thus, the controller 114 would carry out such post-defragmentation erasure or relocation requests from the processor 102 on the related blocks of data 122 on the data storage medium 112.

Although the present invention has been described with reference to preferred embodiments, workers skilled in the art will recognize that changes may be made in form and detail without departing from the spirit and scope of the invention.

What is claimed is:

1. A data storage device comprising:
   a solid state data storage medium;
   multiple data blocks stored in non-contiguous physical locations on the data storage medium; and
   a controller adapted to:
      receive a defragmentation request that includes an instruction to physically relocate at least a portion of the multiple data blocks to contiguous physical locations on the data storage medium;
      associate the non-contiguous physical locations of the multiple data blocks to contiguous logical block addresses;
      maintain the non-contiguous physical locations of the multiple data blocks on the data storage medium; and
      send a notification to a device that the defragmentation request was completed even though data specified to be relocated to contiguous physical locations by the defragmentation request was not relocated to contiguous physical locations.

2. The system of claim 1, wherein the defragmentation request comprises a request to read one of the set of data blocks from one of the logical block addresses and write the one of the set of data blocks to another logical block address.

3. The device of claim 1, wherein the defragmentation request comprises a defragmentation notification.

4. The device of claim 1, wherein the notification indicates the multiple data blocks have been re-located to contiguous physical locations on the data storage medium even though the multiple data blocks remain non-contiguously stored on the data storage medium.

5. The device of claim 1, wherein the solid state memory comprises non-volatile flash memory.

6. The device of claim 5, further comprising one of a magnetic disc storage medium and an optical disc storage medium.

7. A device comprising:
   a controller adapted to:
      receive a defragmentation instruction indicating data stored on a data storage medium is to be relocated to a different physical location of the data storage medium;
      execute a defragmentation operation that is different than the defragment instruction and is executed instead of the defragmentation instruction, the defragmentation operation including:
         mapping non-contiguous physical block addresses of the data to contiguous logical block addresses;
         maintaining the non-contiguous physical block addresses of the data on the data storage medium; and
         generating a notification indicating the data has been physically re-located to the different physical location on the data storage medium even though the data has not been physically relocated on the data storage medium.

8. The device of claim 7, further comprising the controller adapted to:
   determine if the defragmentation instruction is intended to locate physical data blocks contiguously on a data storage medium; and
   execute the defragmentation operation when the defragmentation instruction is intended to locate physical data blocks contiguously on a data storage medium.

9. The device of claim 8, wherein:
   the defragmentation request comprises a defragmentation notification; and
   the controller executes the defragmentation operation responsive to the defragmentation notification.

10. The device of claim 8, further comprising:
    the data storage device including:
       the data storage medium; and
       the controller further adapted to receive a defragmentation request that includes an instruction to relocate one or more of the related data blocks.

11. The device of claim 7, wherein the data storage medium comprises non-volatile solid state memory.

12. A method comprising:
    detecting a first defragmentation operation for a data storage device, the defragmentation operation comprising requests to relocate data into contiguous physical locations on a data storage medium; and
    performing a modified defragmentation operation instead of the first defragmentation operation, the modified defragmentation operation performed on the data storage device when the first defragmentation operation is detected, the modified defragmentation operation comprising:
       mapping physical locations of the data to contiguous logical block addresses;
       maintaining any non-contiguous physical locations of the data on the data storage medium; and
       generating a notification indicating the data has been physically relocated even though the data has not been physically relocated.

13. The method of claim 12, wherein the requests include read and write instructions to relocate one or more physically non-contiguous data blocks such that they are located at physically contiguous locations.

14. The method of claim 12, further comprising:
    executing the defragmentation operation on the data storage device, the defragmentation operation comprising a defragmentation notification;
    wherein detecting a defragmentation operation comprises receiving the defragmentation notification.

15. The method of claim 12, wherein the data storage medium comprises non-volatile solid state memory.

16. The method of claim 15, wherein the data storage device comprises one of a magnetic disc storage medium and an optical disc storage medium.

17. The method of claim 12, wherein:
    the data storage device comprises a map indicating a relationship between physical block addresses of the data blocks on the data storage medium and logical block addresses; and
    mapping the physical block addresses of the data blocks to contiguous logical block addresses including modifying the map such that the physical block addresses of the data blocks are mapped to contiguous logical block addresses.

* * * * *